United States Patent
Yuan et al.

(10) Patent No.: US 7,328,214 B2
(45) Date of Patent: Feb. 5, 2008

(54) METHOD OF DELIVERING AN ELECTRONIC DOCUMENT TO A REMOTE ELECTRONIC DEVICE

(75) Inventors: Jianwei Yuan, Cumming, GA (US); Olav A. Sylthe, Atlanta, GA (US)

(73) Assignee: Arizan Corporation, Atlanta, GA (US)

( * ) Notice: Subject to any disclaimer, the term of this patent is extended or adjusted under 35 U.S.C. 154(b) by 402 days.

(21) Appl. No.: 11/018,943

(22) Filed: Dec. 21, 2004

(65) Prior Publication Data

US 2006/0136371 A1   Jun. 22, 2006

(51) Int. Cl.
  *G06F 17/30* (2006.01)
  *G06F 17/00* (2006.01)
(52) U.S. Cl. .................................. 707/10; 707/102
(58) Field of Classification Search ............... 707/102, 707/10
  See application file for complete search history.

(56) References Cited

U.S. PATENT DOCUMENTS 5,893,109 A * 4/1999 DeRose et al. .......... 707/104.1
7,162,473 B2 * 1/2007 Dumais et al. ................ 707/5
2002/0161796 A1 * 10/2002 Sylthe ........................ 707/500
2006/0117019 A1 * 6/2006 Sylthe .......................... 707/10

* cited by examiner

*Primary Examiner*—Don Wong
*Assistant Examiner*—Angela M Lie
(74) *Attorney, Agent, or Firm*—Philip E. Levy; Eckert Seamans Cherin & Mellott, LLC

(57) ABSTRACT

A method of preparing a document for delivery to an electronic device including building a graph structure, include hyperlink nodes and bookmark nodes, representing a map of the document, and traversing and paginating the graph structure into successive pages each having a page index value. For each hyperlink node, the method includes storing in association with therewith a bookmark page index value that is the page index value of the page that includes the bookmark node having the bookmark that is the destination of the hyperlink of the hyperlink node. The pages may be selectively delivered to the electronic device. When a hyperlink in one of the pages is activated, the bookmark page index value that is stored in association with the corresponding hyperlink node may be identified, and the page that corresponds to the identified bookmark page index value may be transmitted to the electronic device.

15 Claims, 9 Drawing Sheets

FIRST PARAGRAPH.
SECOND PARAGRAPH WITH BOLD AND RED TEXT.
*FIG. 4A*
| CELL ONE | CELL TWO |
|---|---|
| CELL THREE | CELL FOUR |
*FIG. 5A*
THIS DOCUMENT HAS A SUBDOCUMENT OF IMAGES LIKE THIS ONE 
SECOND PARAGRAPH CONTAINS THE SAME IMAGE 
*FIG. 6A*

METHOD OF DELIVERING AN ELECTRONIC DOCUMENT TO A REMOTE ELECTRONIC DEVICE

BACKGROUND OF THE INVENTION

1. Field of the Invention

The invention relates to the delivery of electronic documents, and in particular to a method for delivering an electronic document having hyperlinks to a remote electronic device.

2. Background Information

Mobile communication devices are becoming increasingly popular for business and personal use due to a relatively recent increase in number of services and features that the devices and mobile infrastructures support. Handheld mobile communication devices, sometimes referred to as mobile stations or handheld electronic devices, are essentially portable computers having wireless capability, and come in various forms. Numerous types of mobile communication devices are known. Examples of such mobile communication devices include, for instance, personal data assistants (PDAs), handheld computers, two-way pagers, cellular telephones, and the like. While their reduced size is an advantage to portability, bandwidth and processing constraints of such devices present challenges to the downloading and viewing of documents, such as word processing documents, tables and images.

Electronic documents are produced using various computer programs, such as word processors, spreadsheet programs, financial software, and presentation software. In addition to text, documents can contain navigational information such as hyperlinks and bookmarks. As is known in the art, and as used herein, a hyperlink refers to a graphic or piece of text in a hypertext document that allow you to "jump" to another section of the same document or to another document on a network such as the World Wide Web by activating (e.g., clicking on) the hyperlink. In addition, as is known in the art, and as used herein, a bookmark, also known as an anchor, refers to the destination of a particular hyperlink (i.e., the location within the particular document that was pointed to by the hyperlink).

When the user of a mobile communication device wishes to access an electronic document which resides on a remote computer and view a certain part of the document on the mobile communication device, the entire electronic document is typically transmitted over a potentially bandwidth-constrained wireless network to the mobile communication device. This often happens when a user of a mobile communication device wishes to open and view an attachment to an email message. In wireless communications systems, attachments are typically not automatically included with an email message due to bandwidth constraints, but instead are stored on the email server and must be requested in order to open and view them. For example, if a 400-page document is attached to an email, and a user wishes to view only the one-page terms and conditions section of the document that is pointed to by a hyperlink provided in the document (the terms and conditions are a bookmark), the entire document is typically transmitted to the mobile communication device, of which the user only views a small portion on the mobile communication device.

Once on the device, the electronic document is viewed using the mobile communication device's user interface, which typically differs from the user interface used to create and view the document on a personal computer. For example, while the user interface on a personal computer used to create an electronic document may include a large, color display and a pointing device such as a mouse, the mobile communication device may have a small, non-color screen, and may not have a mouse. In addition, the mobile communication device typically has greater processing power and memory limitations than a personal computer used to view the electronic document, which may be very large in size. Thus, there is a need for an improved method for delivering electronic documents, particularly those containing hyperlinks, to a remotely located electronic device, such as a mobile communication device.

SUMMARY OF THE INVENTION

An improved method for delivering an electronic document having hyperlinks to a remote electronic device enables the retrieval of hyperlink target content (bookmark) without having to download the entire document content onto a mobile communication device over a potentially bandwidth-constrained wireless network. As a result, the usage consumption of the cpu/memory/power of mobile communication devices may be reduced, along with the minimization of overall network bandwidth usage.

These and other aspects of the invention are provided by a method of preparing a document for delivery from a server to a remote electronic device including building a graph structure representing a map of the document, wherein the graph structure has a plurality of nodes. The nodes of the graph structure include one or more hyperlink nodes each having a corresponding hyperlink and one or more bookmark nodes each having a corresponding bookmark, wherein the hyperlink of each of the one or more hyperlink nodes has as its destination the bookmark of one of the one or more bookmark nodes. The method further includes traversing and paginating the graph structure into successive pages based on a page size limit, wherein each of the nodes is included in one of the successive pages and wherein each of the pages has a corresponding page index value. Finally, for each of the nodes that is one of the hyperlink nodes, the method includes storing in association with the one of the hyperlink nodes during the traversing and paginating steps a bookmark page index value. The bookmark page index value is the page index value of the page that includes the bookmark node having the bookmark that is the destination of the hyperlink of the one of the hyperlink nodes.

The invention also relates to a method of delivering a document from a server to a remote electronic device including performing the building, traversing and paginating and storing steps described above to prepare the document for delivery. The method also includes steps of transmitting a particular one of the pages from the server to the remote electronic device, wherein the particular one of the pages contains the hyperlink of one or more of the hyperlink nodes, receiving an information request from the remote electronic device indicating that the hyperlink of a particular one of the one or more of the hyperlink nodes has been activated, identifying the bookmark page index value that is stored in association with the particular hyperlinks node, and transmitting a second one of the pages to the remote electronic device, wherein the second one of the pages corresponds to the identified bookmark page index value. The second one of the pages may be the first page transmitted following the information request, or may be a subsequent page transmitted thereafter.

In either embodiment, the remote electronic device may be a mobile communication device, such as a PDA or cell phone, or a non-mobile communication device, such as a PC. In addition, the server may be an email server and the document may an attachment to an email. In the preferred embodiment, the graph structure is a Document Object Model (DOM). Moreover, the graph structure may be built when the document is requested, or may have been built previously and stored (e.g., cached), and accessed when the document is requested.

BRIEF DESCRIPTION OF THE DRAWINGS

A full understanding of the invention can be gained from the following Description of the Preferred Embodiments when read in conjunction with the accompanying drawings in which:

FIG. 4A is an exemplary word processing document.

FIG. 5A is an exemplary table document.

FIG. 6A is an exemplary word processing document containing an image subdocument.

Similar numerals refer to similar parts throughout the specification.

DESCRIPTION OF THE PREFERRED EMBODIMENTS

Figure 1:
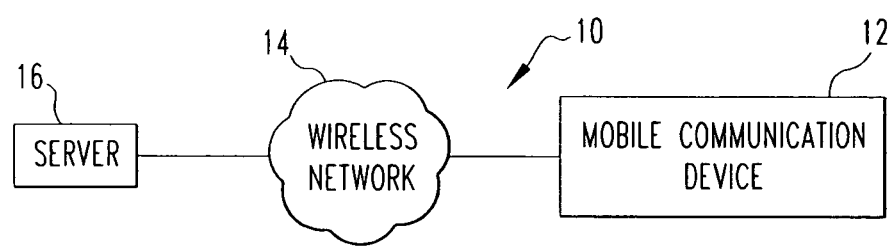
FIG. 1 is a block diagram of a network environment in accordance with the invention.

With reference to FIG. 1, network environment 10 is shown in which the invention may be practiced. Network environment 10 includes a mobile communication device 12 communicating via a wireless network 14 to a server 16 for downloading documents, such as email attachments, stored on server 16 to the mobile communication device 12. Sever 16 may be, for example, an email server associated with the mobile communication device 12. While only one mobile communication device 12 and server 16 are shown for illustration purposes, a person of skill in the art will understand that network environment 10 could have many such mobile communication devices and servers for performing services such as, without limitation, email services, hosting web sites or graphic download sites, and providing access to picture files such as JPEG, TIFF, BMP, PNG, SGI, MP4, MOV, GIF, SVG. As would be understood by one of ordinary skill in the art, wireless network 14 may be a GSM/GPRS, CDPD, TDMA, iDEN Mobitex, or DataTAC network, or a future network such as EDGE or UMTS, or the like.

Referred to throughout this document, for the purpose of describing the preferred embodiment of the invention, is the structure of a Document Object Model (DOM) for a document, such as an email attachment, to be viewed on mobile communication device 12. The DOM for any document is a graph structure that represents a map of the document. The server 16 uses a file-parsing distiller in the preferred embodiment, for a specific document type, to build the DOM structure representing an attachment (a particular document) of that document type. The document DOM structure is, once created, stored in a memory cache of server 16, and can be iterated bi-directionally. Although one particular graph structure is described herein, other graph structures may be used in connection with the invention.

Figure 2:
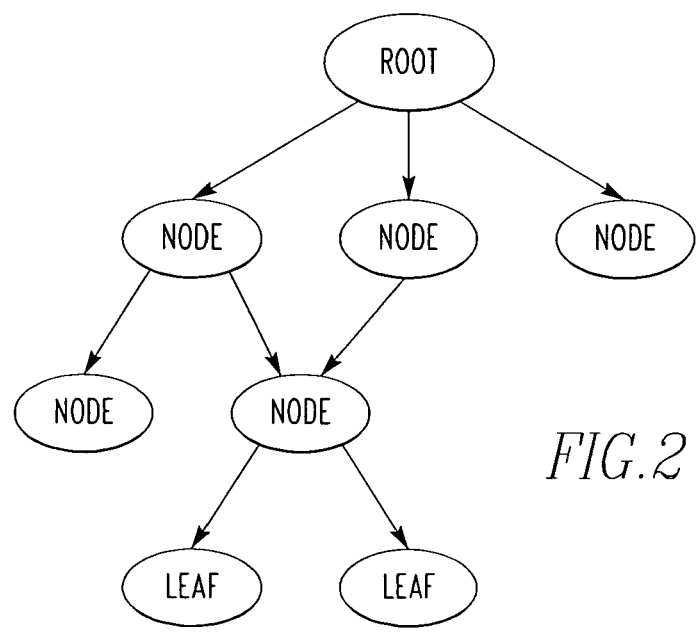
FIG. 2 is a tree diagram showing the basic structure of a Document Object Model (DOM) used in the preferred embodiment of the invention.

As shown in FIG. 2, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 3:
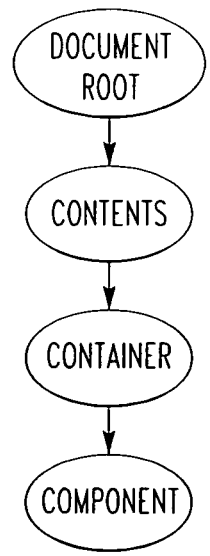
FIG. 3 shows the top-level of the DOM structure in FIG. 2.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the server 16 builds the DOM structure for an attachment file for the first time, the top-level structure is a single parent-child chain as shown in FIG. 3:

Three types of components are defined by the server 16: text components, table components and image components, which represent text, tables and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 4B:
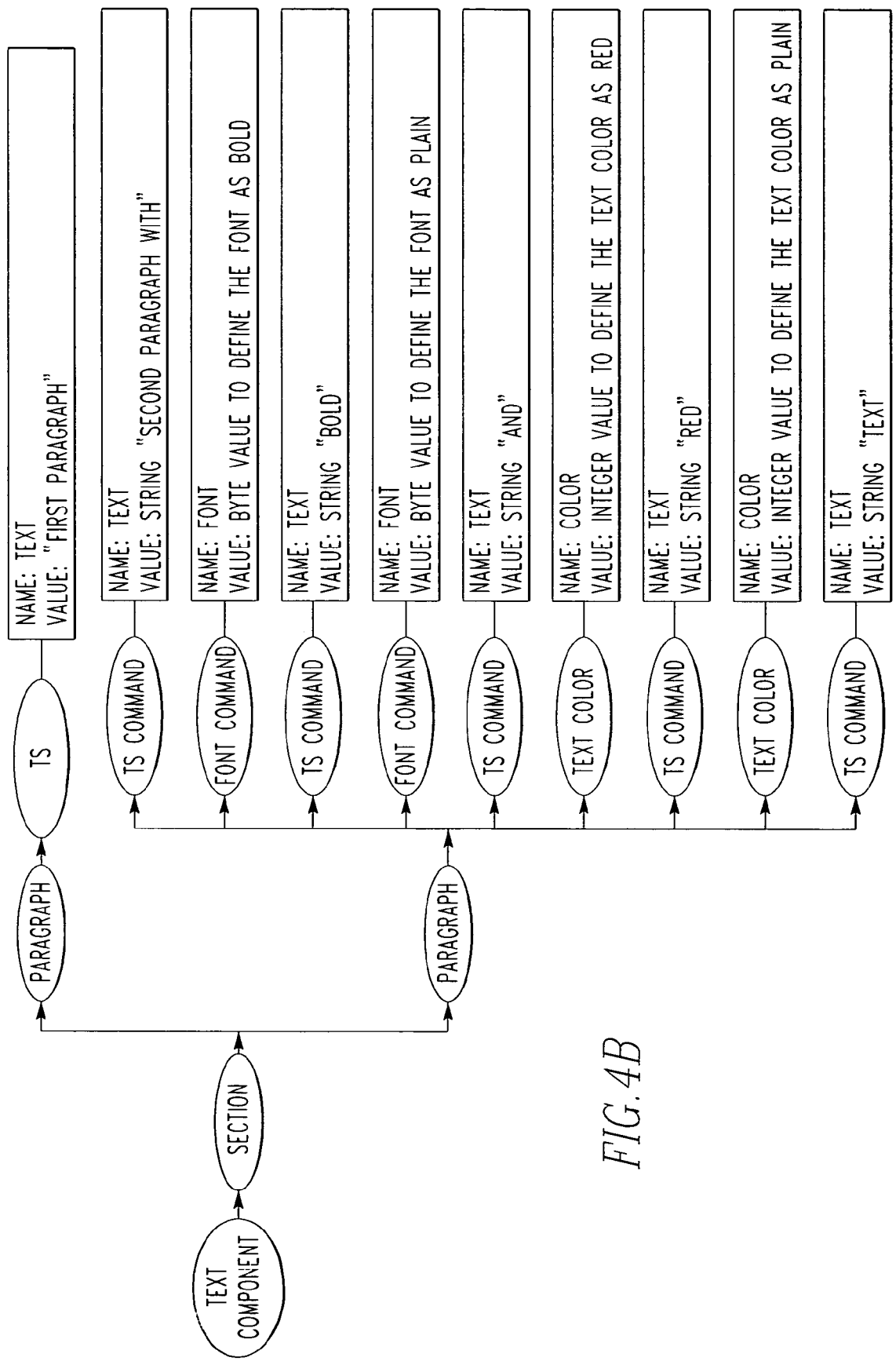
FIG. 4B shows a DOM structure for the word processing document shown in FIG. 4A.

FIG. 4A shows a sample text document, and FIG. 4B shows the corresponding document DOM structure. As FIG. 4B demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc) changes, a corresponding text property command is created and the change value is added to that command as an attribute. The subsequent text segment command records the text with the same text property as an attribute. As document structure gets richer and more complex, more commands of corresponding types are created and the document properties are added as attributes to those commands.

Figure 5B:
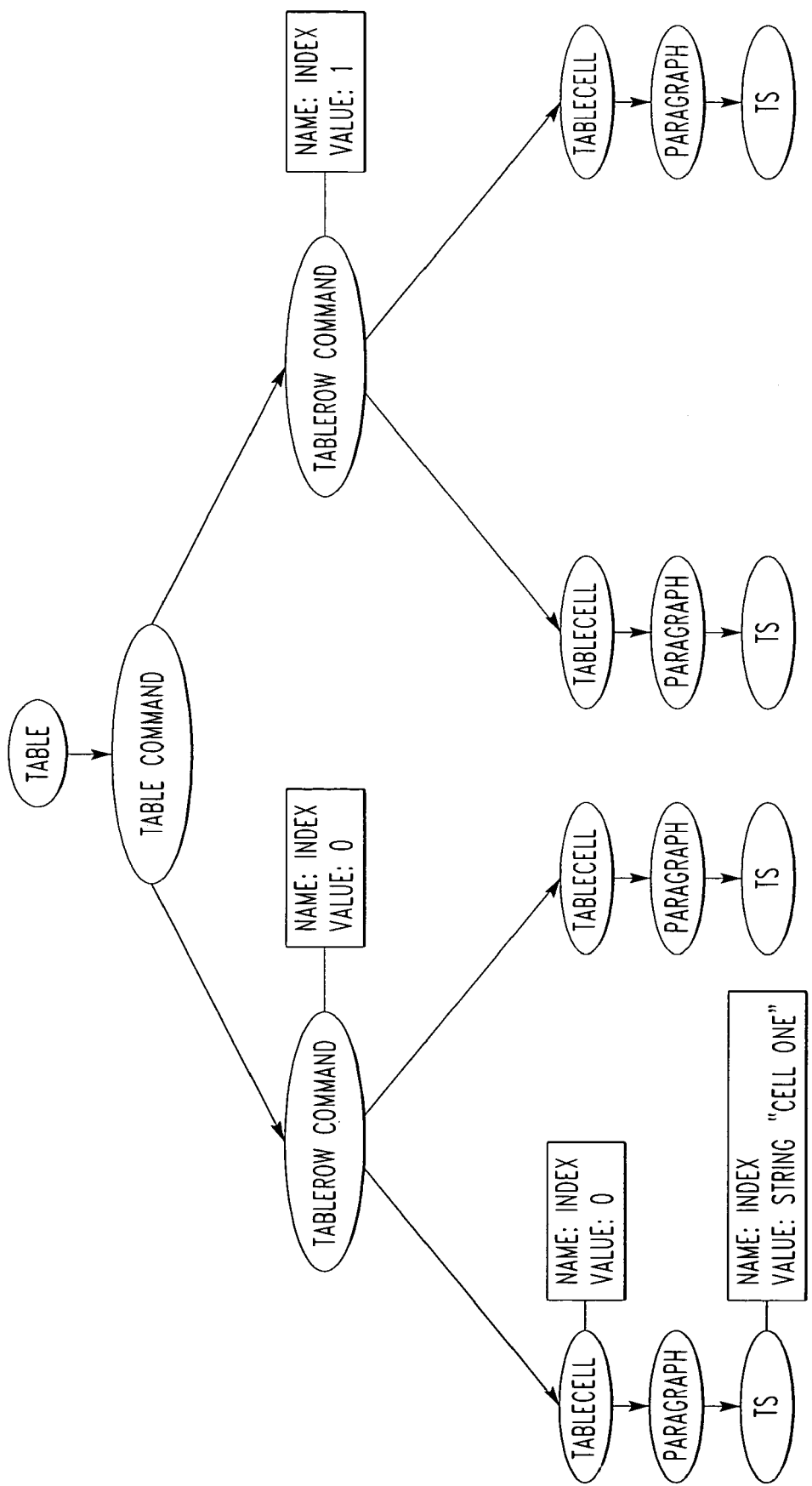
FIG. 5B shows a DOM structure for the table document shown in FIG. 5A.

The table component has the same three types of commands as the text component, but different command names. FIG. 5A shows a sample table document, and the corresponding document DOM structure for the sample table document is shown in FIG. 5B. As shown in FIG. 5B, the table component has physical entity type commands of table, tablerow and tablecell, where the tablecell command can contain all available commands for the text component. In the example shown, the first child TableRow command of the table command has an attribute "Index" defined by value of 0. This indicates that the indicated table row is the first one defined in the table. The attribute of the leftmost tablecell command in FIG. 5B has the same meaning.

Figure 6B:
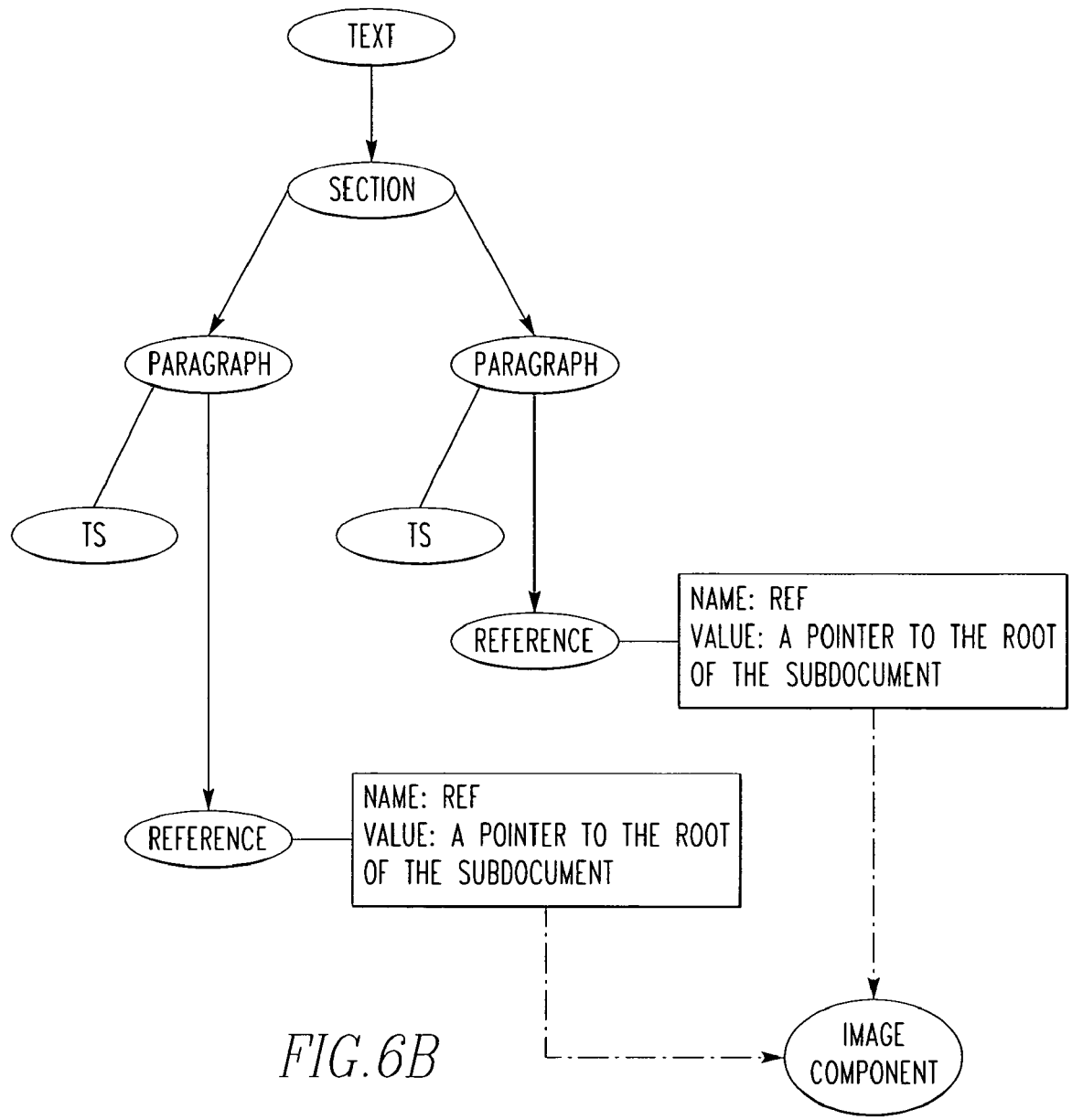
FIG. 6B shows a DOM structure for the word processing document shown in FIG. 6A.

A document sometimes contains subdocuments, for example images, tables, text boxes, etc. The DOM structure set forth herein uses a reference command to point to the graph of such subdocuments. Thus, for the following sample document shown in FIG. 6A, the server 16 generates the DOM structure shown in FIG. 6B. The structure shown in FIG. 6B is identical to that discussed above in connection with FIGS. 4B and 5B, except for the attributes of the two reference commands. The server 16 constructs the image in "Sample Three" as a separate image component, which contains all of the image data in its own DOM hierarchy. In the DOM structure for the main document, the values of the "Ref" attributes of those two reference commands point to the image component, as indicated by the dashed lines, such that the DOM structure connects together all parts of the document.

Having described the document DOM structure used to implement an embodiment of the invention, a detailed discussion will now be provided of a method of delivering, upon request, documents that contain hyperlinks from server 16 to mobile communication device 12 according to the invention. The method is a client and server side solution. The client is the mobile device attachment viewing application provided on mobile communication device 12 and the server is the document (attachment) handling process on server 16. This solution contains three (3) operational stages: (1) document DOM construction (FIG. 7), (2) hyperlink info processing/delivery (FIGS. 8A and 8B), and hyperlink target contents delivery (FIG. 9). The following sections describe each stage in detail.

Figure 7:
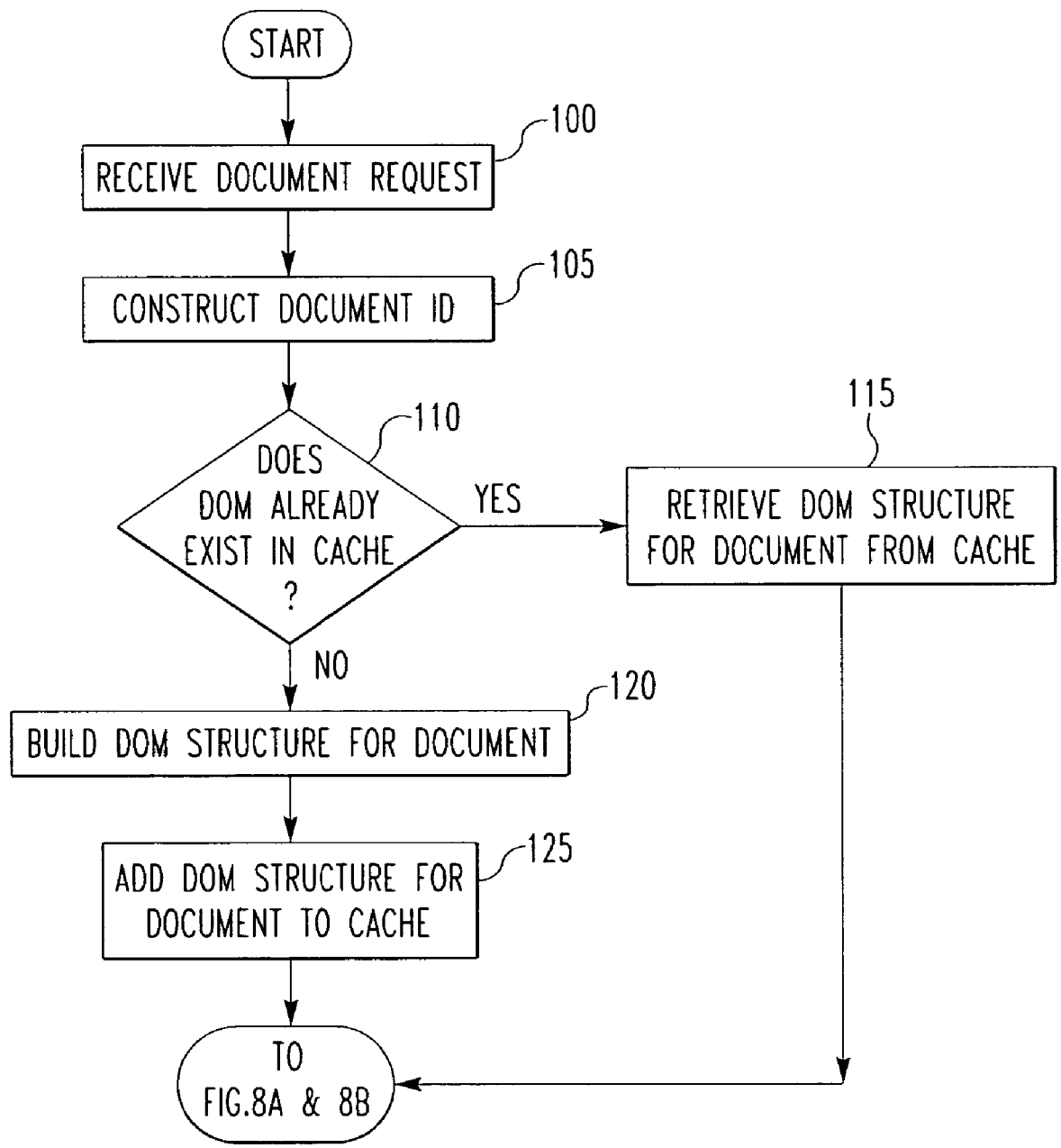
FIG. 7 is a flowchart showing a first stage of a method of delivering an electronic document according to the invention.

FIG. 7 is a flowchart showing the steps of stage 1. It will be noted that, in performing the steps shown in FIG. 7, the server 16 uses a map in memory for document DOM cache storage wherein the key to the map is the document ID. Since the key to the memory map is the document ID, the algorithm used to calculate the document ID must guarantee the uniqueness of the key. According to the preferred embodiment, as set forth below, the algorithm used inside the server 16 to calculate the document ID is the MD5 messaging encryption algorithm invented by Professor Ronald L. Rivest of MIT Laboratory for Computer Science and RSA Data Security, Inc. There are several other hashing options that can be used. However, MD5 is the most efficient and reliable one based on the broad range of different document contents required to be processed by the server 16.

Referring to FIG. 7, initially, the user of mobile communication device 12 sends a request to the server 16 to view a document, such as an email attachment, and, at step 100, that request is received by server 16. The request sent by mobile communication device 12 includes the following information: (1) two attributes, and (2) a number of bytes mobile communication device 12 requires (referred to herein as the variable RequireSize) as a response from the server 16 (e.g. 3 K bytes). The two attributes are whether the mobile communication device 12 is a color or monochrome device, and the screen size (width×height×color depth) of the mobile communication device 12 in pixels. Other information about the mobile communication device 12 can also be transmitted to the server 16 (e.g. memory size). Next, at step 105, the server 16 constructs a document ID based on the document contents. Preferably, to construct the document ID, the original document file is opened and read in binary mode. The server 16 creates an MD5 context structure, hashes the MD5 context structure with raw binary data byte-by-byte from the file, and finalizes the MD5 context structure and retrieves the 16 byte key for the file. The MD5 context structure has the following structure in syntax of C++ language:

```
typedef struct
{
    unsigned long adwState[4]; /* state (ABCD) */
    unsigned long adwCount[2]; /* number of bits, modulo 2^64
    (lsb first) */
    unsigned char abyBuffer[64]; /* input buffer */
} tMD5_CTX;
```

Next, at step 110, the server 16 uses the document ID to check the document DOM cache to determine whether the document DOM structure for the requested document has been previously constructed. If the document DOM structure does exist in the cache, then, at step 115, the document DOM structure is retrieved from cache and the method proceeds to stage 2 shown in FIGS. 8A and 8B. If, however, the document DOM structure does not exist in the cache, then, at step 120, the server 16 builds the DOM structure for the document as described elsewhere herein. Next, at step 125, the server 16 adds the DOM structure just built to the cache, and the method proceeds to stage 2 shown in FIGS. 8A and 8B.

Caching the document DOM structure requires considerable memory, and therefore increases the overall hardware deployment cost. On the other hand, building the DOM structure for a document is even more time and CPU intensive in contrast to the document key construction operation, especially for big documents. Since processing time is more critical than hardware deployment cost for wireless operation, caching the document DOM is the approach adopted for the preferred embodiment, rather than building the DOM structure for the document each time the server 16 receives a viewing request and then discarding the structure after sending the response back to the mobile communication device 12. It will be appreciated, however, that this latter method (creating the DOM structure each time and discarding it) may be employed without departing from the scope of the invention.

Figure 8A:
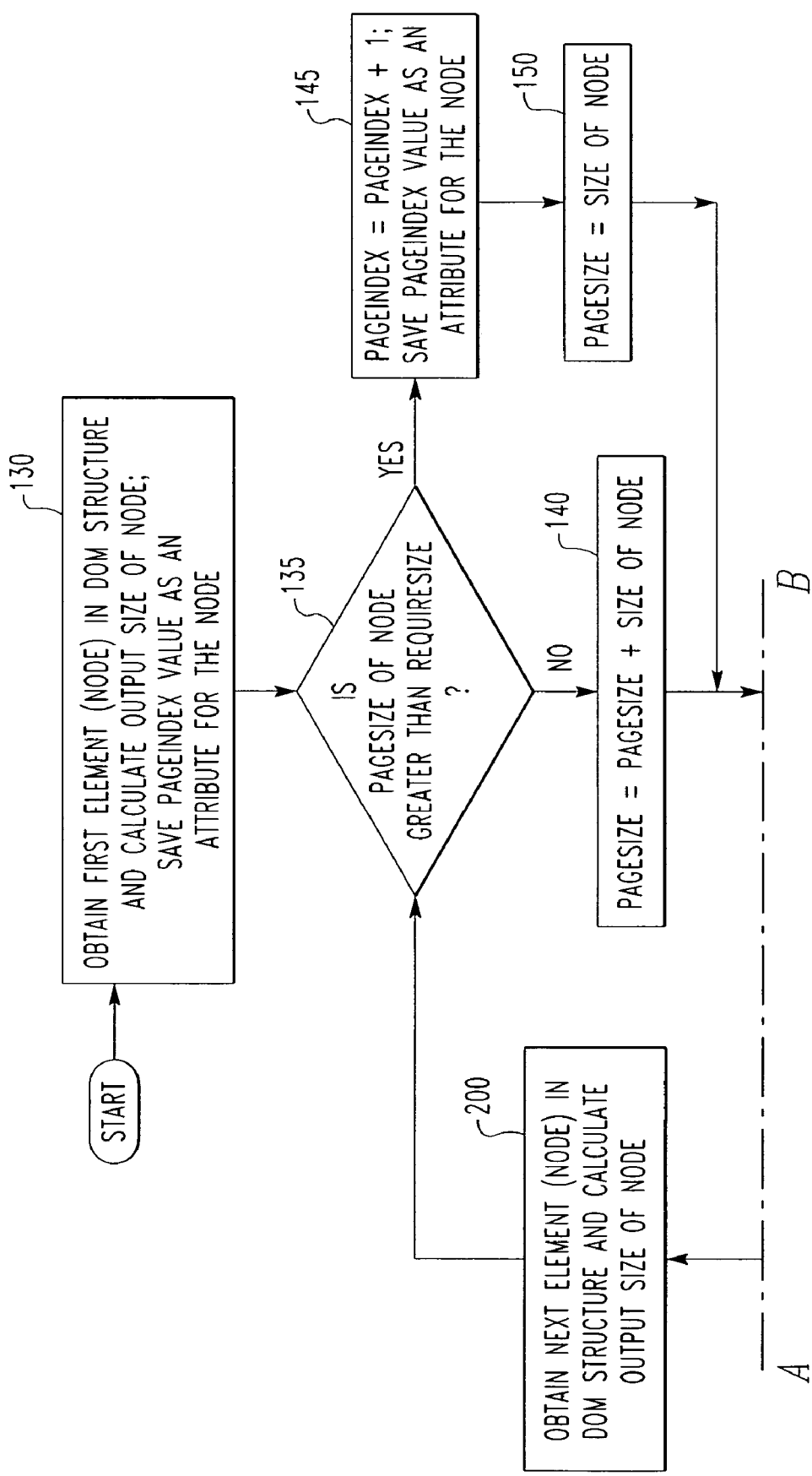
FIGS. 8A and 8B are a flowchart showing a second stage of a method of delivering an electronic document according to the invention.
Figure 8B:
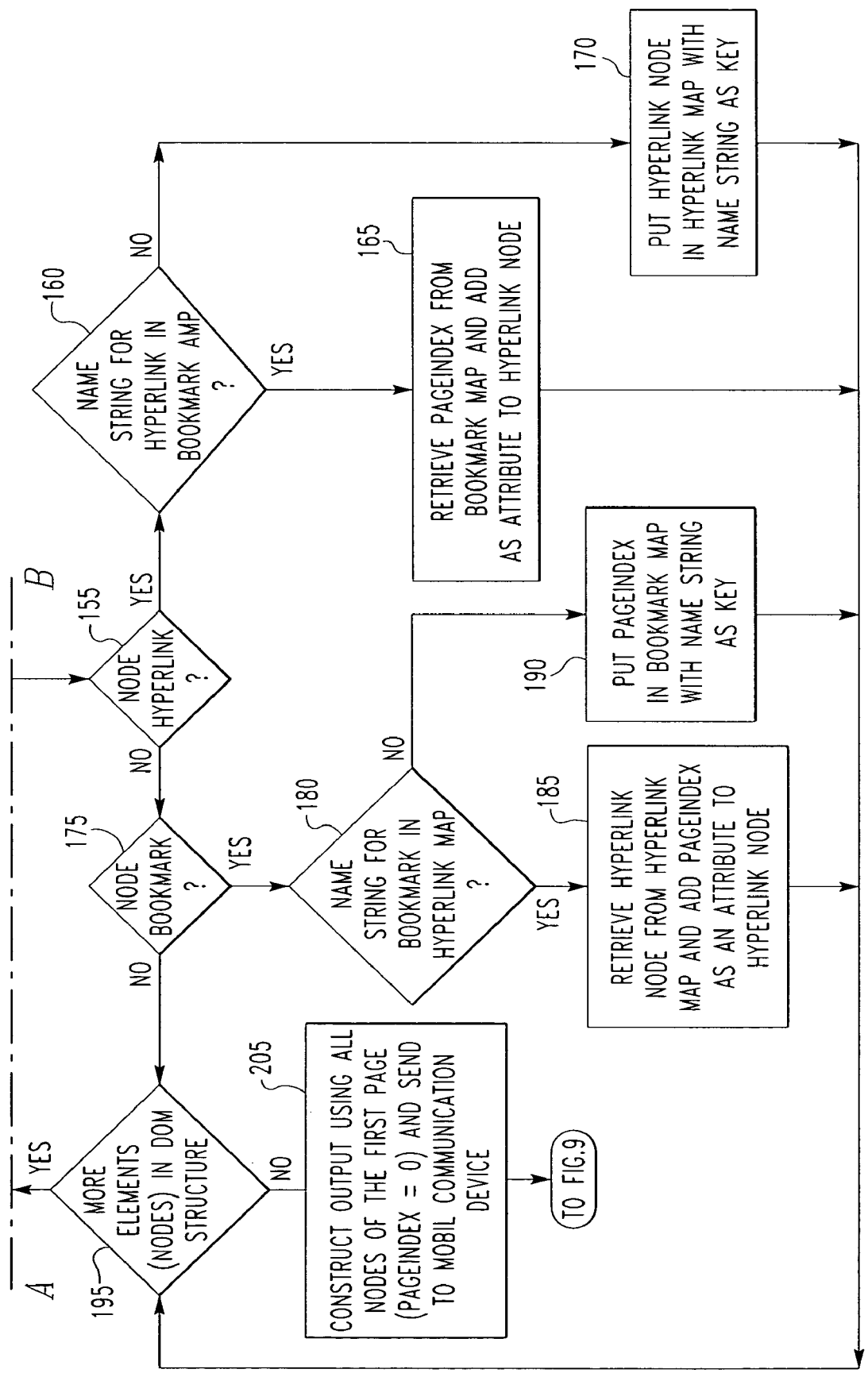
Figure 9:
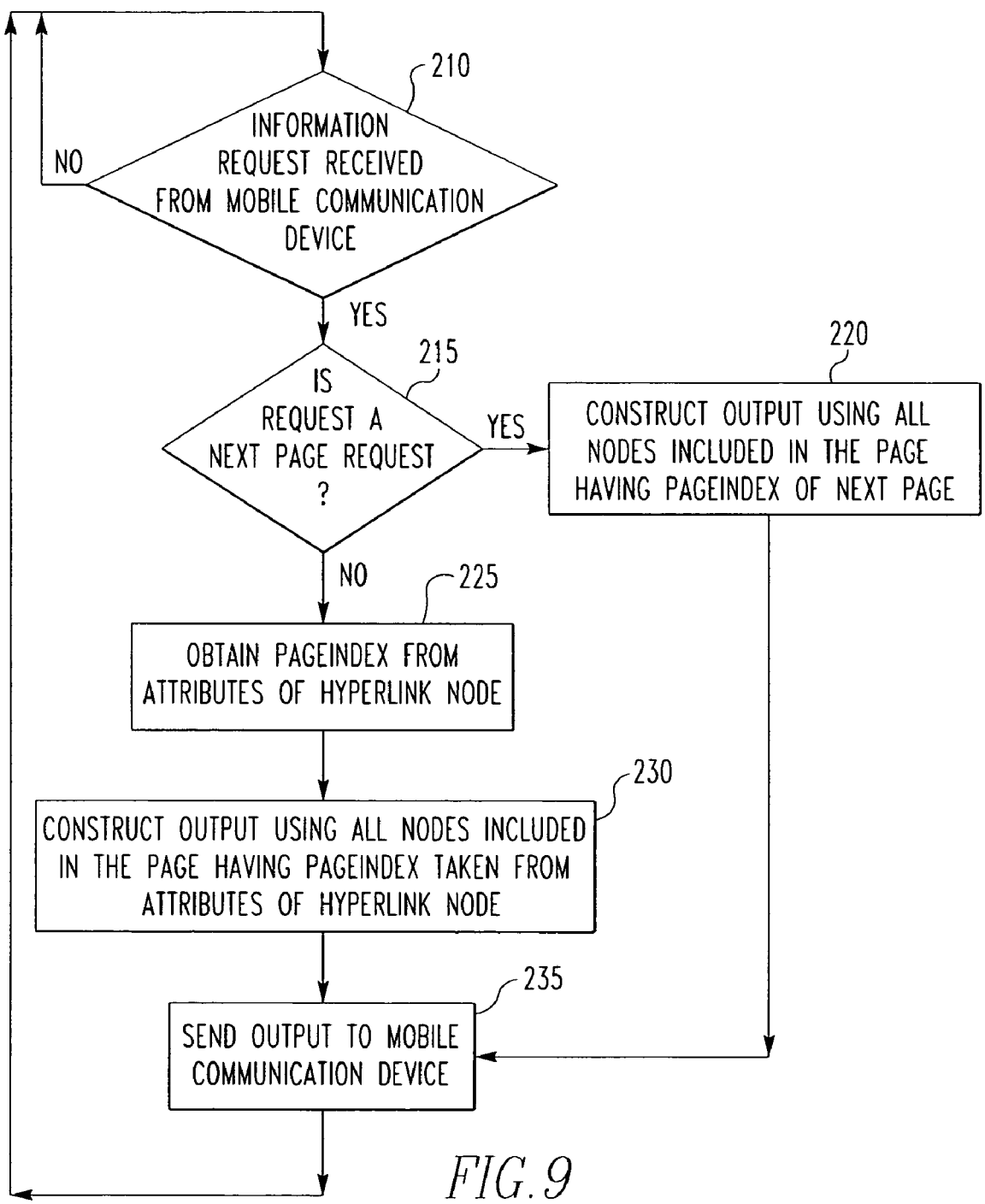
FIG. 9 is a flowchart showing a third stage of a method of delivering an electronic document according to the invention.

FIGS. 8A and 8B are a flowchart showing the steps of stage 2 described above. The following terms and variables are mentioned in FIGS. 8A and 8B:

PageIndex is a variable defined in the server 16 and used by the server 16 to record the current page index (number) being paginated by the server 16. The page index is initially set to 0 indicating "Page 1."

PageSize is a variable defined in the server 16 and used by the server 16 to record the current size for the page being paginated and is reset to 0 when paginating a new page.

Hyperlink map is a variable defined in the server 16 which is a container consisting of the element type of hyperlink node in the document DOM structure. The key (ID) for each element (each hyperlink node) in the hyperlink map is the corresponding name string for the hyperlink, which is the name of the destination of the hyperlink in question (a bookmark). Initially, the hyperlink map is empty.

Bookmark map is a variable defined in the server 16 which is a container consisting of the element type of current page index (PageIndex value) for the bookmark in the document DOM structure. The key (ID) for each element (each bookmark node) in the container is the corresponding name string for the bookmark, which is the name identifying the bookmark (the destination of the associated hyperlink). Initially, the bookmark map is empty.

In stage 2, as shown in FIGS. 8A and 8B, the server 16 traverses through the DOM structure of the document and breaks the DOM structure up into a number of discrete blocks of information, each one being referred to as a page, each block having a size equal to the RequireSize specified by the mobile communication device 12. By doing so, server 16 paginates the DOM structure according to the specified size and assigns each block of information (i.e., each node within the block) a PageIndex value. In addition, while doing so, server 16 also adds as an attribute to each hyperlink node the PageIndex value associated with the bookmark that corresponds to the hyperlink node (i.e., the bookmark that is the destination of the hyperlink). As a result, each hyperlink node forming a part of a document DOM structure will have information enabling the page or block of information containing its corresponding bookmark to be readily identified.

Referring to FIGS. 8A and 8B, the method begins at step 130, where server 16 obtains the first element (node) in the DOM structure of the requested document and calculates the output size of that node. Also, the PageIndex value (zero) is saved as an attribute to the first node so that the first node can later be identified as the first node of that block/page (the first page). Next, at step 135, a determination is made as to whether the PageSize variable (initially set to zero) plus the calculated output size of the node is greater than the specified RequireSize. If the answer is no, which will be the case for the first node, then at step 140, the PageSize variable is set equal to the current PageSize value plus the output size of the node. If the answer at step 135 is yes, meaning that the node in question, if added to the current page, would cause the current page to exceed the RequireSize (and thus that a new page should be started), then, at step 145, the PageIndex variable is incremented by one (new page started). Also, the new PageIndex value is saved as an attribute to the current node so that it may later be identified as the first node (i.e., the staring point) of that particular block/page. Then, at step 150, the PageSize value is set equal to the output size of the current node.

Following step 140 or step 150, whichever the case may be, a determination is made, at step 155, as to whether the current node is a hyperlink node. If the answer is yes, then, at step 160, a determination is made as to whether the name string for the hyperlink in the node is in the bookmark map (i.e., has that name string been added to the bookmark map as of that point, meaning that the corresponding bookmark has been processed). If the answer at step 160 is yes, then, at step 165, server 16 retrieves the PageIndex value stored in the bookmark map in association with the name string and adds that PageIndex value as an attribute to the current hyperlink node. If, however, the answer at step 160 is no, then, at step 170, the current hyperlink node is added to the hyperlink map with the corresponding name string as the key for that element.

Referring again to step 155, if the answer at that step is no (node is not a hyperlink node), then, at step 175, a determination is made as to whether the current node is a bookmark node. If the answer at step 175 is yes, then, at step 180, a determination is made as to whether the name string for the bookmark in the bookmark node is in the hyperlink map. If the answer at step 180 is yes, then, at step 185, the hyperlink node from the hyperlink map that is associated with the name string is retrieved and the current PageIndex is added as an attribute to the retrieved hyperlink node. If, however, the answer at step 180 is no, then, at step 190, the current PageIndex is added to the bookmark map with the name string for the current bookmark being the key for that element.

Referring again to step 175, if the answer at that step is no (which means that the current node is neither a hyperlink node nor a bookmark node), or following any of steps 165, 170, 185 or 190, as the case may be, then, at step 195, a determination is made as to whether there are more element (nodes) left to process in the DOM structure. If the answer is yes, then, at step 200, the next element (node) in the DOM structure is obtained and the method proceeds to step 135. If, however, the answer at step 195 is no (meaning the entire DOM structure has been traversed), then, at step 205, an output consisting of the first block of information (i.e., the first page) is constructed and sent to the mobile communication device 12. Specifically, all nodes beginning with the node having an attribute of PageIndex equal to zero and up to, but not including, the node having an attribute of PageIndex equal to one are gathered and included in the output.

As will be appreciated, the method illustrated in FIGS. 8A and 8B will result in the pagination (i.e., division into blocks of information), according to a specified size (RequireSize), of the document requested by mobile communication device 12. In addition, at the end of the method illustrated in FIGS. 8A and 8B, each hyperlink node in the document DOM structure will have as an attribute the PageIndex of the bookmark that corresponds to the hyperlink of the hyperlink node. Using that attribute, the page containing the bookmark corresponding to any particular hyperlink can be readily identified and obtained.

FIG. 9 is a flowchart showing the steps of stage 3 of the processing according to the invention. As described above, at the end of stage 2 (FIGS. 8A and 8B), the mobile communication device 12 will have received an output from the server 16 consisting of the first block of information (nodes with PageIndex equal to 0, i.e., the first page) from the requested document. At step 210 shown in FIG. 9, a determination is made as to whether an information request is subsequently received from the mobile communication device 12. According to the invention, the information request will be the result of the user of mobile communication device 12 desiring to receive and view more of the requested document than is currently resident on mobile communication device 12. Such a request will preferably either be a request for the next sequential page (block of information) from the document, or a request for the bookmark (destination) associated with a hyperlink contained in the document information that has already been provided to the mobile communication device 12. Thus, if the answer at step 210 is no, the method returns to step 210 to await such a request. However, if the answer at step 210 is yes, then, at step 215, a determination is made as to whether the request is a request for the next sequential page (block of information) from the document. If the answer at step 215 is yes, then, at step 220, an output is constructed using all of the nodes included in the page that has a PageIndex value equal to the next sequential PageIndex beyond the one currently being viewed on the mobile communication device 12. In particular, all nodes beginning with the node having an attribute of PageIndex equal to the next sequential PageIndex and up to, but not including, the node having an attribute of PageIndex equal to one plus next sequential PageIndex are gathered and included in the output. If, however, the answer at step 215 is no, meaning that the request is a request for the bookmark (destination) associated with a hyperlink (resulting from, for example, "clicking" on the hyperlink), then, at step 225, the PageIndex value contained in the attributes of the corresponding hyperlink node is obtained. At step 230, an output is constructed from all of nodes that are included in the particular page that has a PageIndex value equal to the one obtained in step 225. Specifically, all nodes beginning with the node having an attribute of PageIndex equal to the one obtained in step 225 and up to, but not including, the node having an attribute of PageIndex equal to one plus the PageIndex value obtained in step 225 are gathered and included in the output. Following either step 230 or step 220, whichever the case may be, the method proceeds to step 235, where the constructed output is sent to the mobile communication device 12. The method then returns to step 210 to await another information request.

By using the three stage approach of processing hyperlinks on the server and using the PageIndex as the content identifier, the client on the mobile communication device 12 will be able to retrieve the hyperlink target content (bookmark) without having to download the entire document content onto the mobile communication device 12 over a potentially bandwidth-constrained wireless network. As a result, this approach reduces the usage consumption of the cpu/memory/power of mobile communication device 12. More importantly, this approach will also minimize the overall network bandwidth usage. This approach does, however, require a more intensive server-side operation than that of the prior art. For example, the server 16 will have to traverse the DOM structure of a document each time a mobile communication device 12 sends a view request.

While specific embodiments of the invention have been described in detail, it will be appreciated by those skilled in the art that various modifications and alternatives to those details could be developed in light of the overall teachings of the disclosure. For example, while the invention has been described in connection with the delivery of electronic documents to a mobile communication device, it will be appreciated that the invention may also be utilized in connection with the delivery of electronic documents to a non-mobile electronic device such as a personal computer or the like. Accordingly, the particular arrangements disclosed are meant to be illustrative only and not limiting as to the scope of the invention which is to be given the full breadth of the claims appended and any and all equivalents thereof.

What is claimed is:

1. A method of preparing a document for delivery from a server to a remote electronic device, comprising:

building a graph structure representing a map of said document, said graph structure having a plurality of nodes, said nodes including one or more hyperlink nodes each having a corresponding hyperlink and one or more bookmark nodes each having a corresponding bookmark, wherein the hyperlink of each of said one or more hyperlink nodes has as its destination the bookmark of one of said one or more bookmark nodes;

traversing and paginating said graph structure into successive pages based on a page size limit, wherein each of said nodes is included in one of said successive pages and wherein each of said successive pages has a corresponding page index value; and for each of said nodes that is one of said hyperlink nodes, storing in association with the one of said hyperlink nodes during said traversing and paginating a bookmark page index value, said bookmark page index value being the page index value of the one of said successive pages that includes the one of said bookmark nodes having the bookmark that is the destination of the hyperlink of the one of said hyperlink nodes, and wherein said traversing and paginating and said storing comprise:

determining, for each particular node of said plurality of nodes, whether the particular node is one of said hyperlink nodes or one of said bookmark nodes;

if said particular node is one of said hyperlink nodes, determining whether a first name string of the particular node that is one of said hyperlink nodes is stored in a bookmark map, and if said first name string is stored in said bookmark map, retrieving an associated page index value that is associated with the first name string from said bookmark map and storing the associated page index value in association with the particular node that is one of said hyperlink nodes, and if said first name string is not stored in said bookmark map, storing the particular node that is one of said hyperlink nodes in a hyperlink map in association with said first name string;

and if said particular node is one of said bookmark nodes, determining whether a second name string of the particular node that is one of said bookmark nodes is stored in said hyperlink map, and if said second name string is stored in said hyperlink map, retrieving an associated hyperlink node that is associated with the second name string from said hyperlink map and storing in association with the associated hyperlink node the page index value of the one of said successive pages that includes the particular node that is one of said bookmark nodes, and if said second name string is not stored in said hyperlink map, storing the page index value of the one of said successive pages that includes the particular node that is one of said bookmark nodes in said bookmark map in association with said second name string.

2. The method of according to claim 1, wherein said remote electronic device is a mobile communication device.

3. The method according to claim 2, wherein said server comprises an email server and said document is an attachment to an email.

4. The method according to claim 1, wherein said storing step comprises adding as an attribute to the one of said hyperlink nodes the page index value of the one of said successive pages that includes the one of said bookmark nodes having the bookmark that is the destination of the hyperlink of the one of said hyperlink nodes.

5. The method according to claim 1, wherein said graph structure is a Document Object Model (DOM).

6. The method according to claim 1, further comprising, prior to said traversing and paginating, storing the graph structure of the document and retrieving said stored graph structure upon receipt of a request from said remote electronic to be sent said document.

7. A method of delivering a document from a server to a remote electronic device, comprising:
  building a graph structure representing a map of said document, said graph structure having a plurality of nodes, said nodes including one or more hyperlink nodes each having a corresponding hyperlink and one or more bookmark nodes each having a corresponding bookmark, wherein the hyperlink of each of said one or more hyperlink nodes has as its destination the bookmark of one of said one or more bookmark nodes;
  traversing and paginating said graph structure into successive pages based on a page size limit, wherein each of said nodes is included in one of said successive pages and wherein each of said successive pages has a corresponding page index value; and
  for each of said nodes that is one of said hyperlink nodes, storing in association with the one of said hyperlink nodes during said traversing and paginating a bookmark page index value, said bookmark page index value being the page index value of the one of said successive pages that includes the one of said bookmark nodes having the bookmark that is the destination of the hyperlink of the one of said hyperlink nodes;
  transmitting a particular one of said successive pages from said server to said remote electronic device, said particular one of said successive pages containing the hyperlink of one or more of said hyperlink nodes;
  displaying said particular one of said successive pages on said remote electronic device;
  receiving an information request from said remote electronic device indicating that the hyperlink of a particular one of said one or more of said hyperlink nodes has been activated;
  identifying the bookmark page index value that is stored in association with the particular one of said one or more of said hyperlink nodes;
  transmitting a second one of said successive pages to said remote electronic device, wherein the second one of said successive pages corresponds to the identified bookmark page index value and;
  displaying said second one of said successive pages on said remote electronic device, and, wherein said traversing and paginating and said storing comprise:
  determining, for each particular node of said plurality of nodes, whether the particular node is one of said hyperlink nodes or one of said bookmark nodes;
  if said particular node is one of said hyperlink nodes, determining whether a first name string of the particular node that is one of said hyperlink nodes is stored in a bookmark map, and if said first name string is stored in said bookmark map, retrieving an associated page index value that is associated with the first name string from said bookmark map and storing the associated page index value in association with the particular node that is one of said hyperlink nodes, and if said first name string is not stored in said bookmark map, storing the particular node that is one of said hyperlink nodes in a hyperlink map in association with said first name string; and
  if said particular node is one of said bookmark nodes, determining whether a second name string of the particular node that is one of said bookmark nodes is stored in said hyperlink map, and if said second name string is stored in said hyperlink map, retrieving an associated hyperlink node that is associated with the second name string from said hyperlink map and storing in association with the associated hyperlink node the page index value of the one of said successive pages that includes the particular node that is one of said bookmark nodes, and if said second name string is not stored in said hyperlink map, storing the page index value of the one of said successive pages that includes the particular node that is one of said bookmark nodes in said bookmark map in association with said second name string.

8. The method of according to claim 7, wherein said remote electronic device is a mobile communication device.

9. The method according to claim 7, wherein said server comprises an email server and said document is an attachment to an email.

10. The method according to claim 7, wherein said storing step comprises adding as an attribute to the one of said hyperlink nodes the page index value of the one of said successive pages that includes the one of said bookmark nodes having the bookmark that is the destination of the hyperlink of the one of said hyperlink nodes.

11. The method according to claim 7, wherein said graph structure is a Document Object Model (DOM).

12. The method according to claim 7, wherein said particular one of said successive pages is a first page of said document.

13. The method according to claim 7, further comprising transmitting on or more other ones of said successive pages prior to the step of transmitting said particular one of said successive pages.

14. The method according to claim 7, further comprising, prior to said traversing and paginating, storing the graph structure of the document and retrieving said stored graph structure upon receipt of a request from said remote electronic to be sent said document.

15. The method according to claim 14, wherein said request from said remote electronic to be sent said document further includes a specification of said page size limit.

* * * * *

UNITED STATES PATENT AND TRADEMARK OFFICE
CERTIFICATE OF CORRECTION

PATENT NO. : 7,328,214 B2  Page 1 of 1
APPLICATION NO. : 11/018943
DATED : February 5, 2008
INVENTOR(S) : Jianwei Yuan et al.

It is certified that error appears in the above-identified patent and that said Letters Patent is hereby corrected as shown below:

In the Drawing on drawing sheet and Figure 8b, Sheet 8 of 9, reference 205, line 4, "MOBIL" should be --MOBILE--.

Column 3, line 2, "document may an attachment" should be --document may be an attachment--.

Column 7, line 62, "the staring point" should be --the starting point--.

Signed and Sealed this

Second Day of June, 2009

JOHN DOLL
*Acting Director of the United States Patent and Trademark Office*